United States Patent [19]
Kasperkovitz et al.

[11] Patent Number: 5,839,060
[45] Date of Patent: Nov. 17, 1998

[54] LOGARITHMIC LEVEL DETECTOR AND A RADIO RECEIVER

[75] Inventors: Wolfdietrich G. Kasperkovitz; Hendricus C. De Ruijter, both of Eindhoven, Netherlands

[73] Assignee: U.S. Philips Corporation, New York, N.Y.

[21] Appl. No.: 798,192

[22] Filed: Dec. 9, 1996

[30] Foreign Application Priority Data

Dec. 11, 1995 [EP] European Pat. Off. .............. 95203439

[51] Int. Cl.$^6$ .................................................. H04B 17/00
[52] U.S. Cl. .................................. 455/226.2; 455/226.1; 327/351; 327/352
[58] Field of Search ............................ 455/226.1, 226.2, 455/226.4, 67.1, 67.3; 327/513, 362, 350, 351, 352

[56] References Cited

U.S. PATENT DOCUMENTS

| | | | |
|---|---|---|---|
| 3,916,316 | 10/1975 | Hearn et al. ............................ | 325/304 |
| 3,936,759 | 2/1976 | Macheel ................................... | 328/162 |
| 4,619,002 | 10/1986 | Thro ......................................... | 455/226 |
| 5,149,104 | 9/1992 | Edelstein ................................. | 273/434 |
| 5,182,476 | 1/1993 | Hanna et al. ............................ | 307/491 |
| 5,338,985 | 8/1994 | Fotowat-Ahmady et al. .......... | 307/494 |
| 5,652,800 | 7/1997 | Roberts ................................... | 381/119 |

*Primary Examiner*—Nguyen Vo
*Assistant Examiner*—Edan Orgad
*Attorney, Agent, or Firm*—Edward W. Goodman

[57] ABSTRACT

A logarithmic level detector that provides a very accurate level detector output signal that is greatly insensitive to temperature and process spread. The logarithmic level detector includes a weighted summed reference circuit which is subtracted from a level output signal of the cascade of limiting amplifiers so as to form a relative level detector output signal, and further compensation circuitry at input and output side, and an overall gain stabilizing circuit.

8 Claims, 6 Drawing Sheets

LOGARITHMIC LEVEL DETECTOR AND A RADIO RECEIVER

BACKGROUND OF THE INVENTION

1. Field of the Invention

The present invention relates to a logarithmic level detector comprising a cascade of a plurality of limiting amplifier stages having a rectifier for providing a level signal, this detector further comprising summing means so as to form a summed signal from the respective level signals, the summed signal being a logarithmical amplified version of a level detector input signal.

The present invention further relates to a radio receiver comprising such a logarithmic level detector. Such a radio receiver can be a broadcast receiver, a cordless telephony receiver, a paging receiver, a cellular radio receiver, or any other suitable receiver in which a logarithmic level detector can be used.

2. Description of the Related Art

A logarithmic level detector of the above kind is known from the U.S. Pat. No. 5,338,985. For achieving a very high gain factor, e.g., 80 dB, such a logarithmic level detector comprises many cascaded amplifier stages. Because of multiplicative gain error propagation, the overall gain factor is very sensitive to relatively small gain variations per stage. Such a level detector can be used in a car radio or in a cellular radio, or the like. In a car radio, for instance, the level detector determines the received signal strength from an intermediate frequency signal. A level detector output signal is then used for various purposes, such as, for controlling switching over the radio from a stereophonic reception mode to a monophonic reception mode, for controlling multipath reception of signals, for switching over of radio channels in case the radio implements RDS (Radio-Data System), and so on. Because of the use of the level detector output signal for various purposes at different level detector output signal levels, it is important that, at least for one purpose, the level detector output signal value is very accurate and stable over a wide temperature range. When, for example, the level detector output signal would be used for stereophonic/monophonic mode switching, it would be very annoying if the level detector output signal would vary widely with temperature variations. Such a widely varying level detector output value with temperature would either cause an early switching from a stereophonic to a monophonic receiving mode experienced by a listener hearing a dull sound, or even worse, would cause a late switching from a stereophonic to a monophonic receiving mode experienced by a listener hearing aggressive noise. In particular, in radio receivers having digital signal processing means that can very accurately process absolute level signals, it is therefore very important that the level signal itself is very accurate and does not widely vary with temperature. When implementing a logarithmic level detector in silicon technology, also process spread becomes an important factor determining the overall accuracy of the logarithmic level detector. The known detector does not fulfil the accuracy requirements as stated above.

SUMMARY OF THE INVENTION

It is an object of the present invention to provide a logarithmic level detector of the above kind having a very accurate level detector output signal over a wide temperature range, at least for a given level detector input signal range. It is a further object of the present invention to provide a logarithmic level detector that is inexpensive, simple and robust.

To this end, the logarithmic level detector according to the present invention is characterized in that the logarithmic level detector comprises a first reference limiting amplifier stage for forming a first reference level signal representing a relatively low input signal value, and a second reference limiting amplifier stage for forming a second reference level signal representing a relatively high input signal, weighted summing means for forming a weighted summed reference signal from the first and the second reference signals, and subtracting means for subtracting the weighted summed reference signal from the summed signal so as to form a level detector output signal. The present invention is based upon the insight that a relative level detector output signal is formed instead of an absolute level detector output signal, that, at least over a given range, is insensitive to wide temperature variations because of using reference signals that are in a range of input signals virtually not giving rise to detector level output signal variations for a relative large variation of the input signal value. In fact, a given weighted reference signal is formed that fully compensates for temperature and process spread of the absolute summed signal in a given input range. Preferably, the first reference signal is at zero signal level and the second reference signal is at maximum output level of the level detector.

In an embodiment of a logarithmic level detector according to the present invention, the weighted summing means has an adjustable weighting factor. Herewith, the temperature and process spread insensitive input range can be adjusted.

In a further embodiment of the logarithmic level detector according to the present invention, the subtracting means is a subtracting compensating amplifier stage having a gain factor that is inversely proportional an output voltage swing of the detector. This means that in practical situations, the gain factor is approximately inversely proportional to absolute temperature. Herewith, operation of the compensation according to the present invention is further improved. This is based upon the insight that a temperature varying swing of the level detector output signal is compensated for, i.e., the compensated swing is made independent of temperature variations.

In a further embodiment of the logarithmic level detector according to the present invention, at an input side, the level detector comprises a compensating amplifier input stage having a gain factor that is proportional to the output voltage swing of the detector. This means that in practical situations, the gain factor is proportional to absolute temperature. Herewith, operation of the compensation according to the present invention is still further improved. This is based upon the insight that temperature shifts of regions in input/output characteristics of the level detector in which the level detector output signal is virtually insensitive to relatively large input signal variations, are compensated for, i.e., for a better matching of such characteristics with varying temperatures, the characteristics are shifted to the same relative position. In this respect, it should be realized that at constant gain, the shift of the characteristics with temperature is coupled to an increasing output voltage swing with an increasing temperature.

In order to get an accurate operation of the logarithmic level detector over a large range of input signals, at small extra costs, the logarithmic level detector comprises gain adjustment means for adjustment of a common gain factor of the limiting amplifier stages and the reference limiting amplifiers, the gain adjustment means comprising a cascade of a further limiting amplifier stage having a rectifier for providing a gain adjustment level signal, and an attenuator stage that is positively fed back to the amplifier stage, and comparator means for comparing a weighted summing means output signal with the gain adjustment level signal, an output signal of the comparator means being representative of the common gain factor. Herewith, any inaccuracies in the limiting amplifier stages producing an absolute level signal, are compensated for, i.e., the overall amplification factor becomes independent of temperature and process spread. Such a very constant amplification factor renders the level detector extremely accurate. The positive feedback causes the cascade of the further limiting amplifier and the attenuator to become bi-stable at a given attenuator value. The comparator detects this tendency of the cascade to become bi-stable and an internal state of the comparator changes from monostable to bi-stable or more flip-flop-like operation when the gain adjustment signal is increased. Herewith, the gain of the limiting stages is accurately controlled. This leads to the insight that a very accurate overall gain can be adjusted solely based on the properties of the attenuator stage that can easily be made temperature independent.

In an embodiment of the logarithmic level detector according to the present invention, the attenuator stage is a resistive network of which an attenuation factor is an inverse of the common gain factor. Herewith, the overall gain is the reverse of the attenuation factor to the power of the number of limiting amplifier stages.

BRIEF DESCRIPTION OF THE DRAWINGS

The present invention will now be described, by way of example, with reference to the accompanying drawings, wherein.

Throughout the figures, the same reference numerals are used for the same features.

DESCRIPTION OF THE PREFERRED EMBODIMENTS

Figure 1:
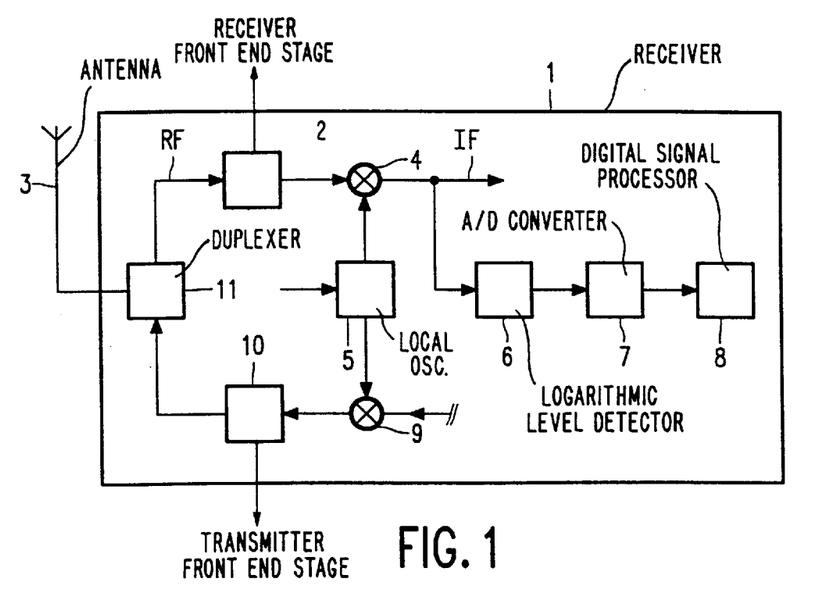
FIG. 1 schematically shows a radio receiver according to the present invention.

FIG. 1 schematically shows a radio receiver 1, according to the present invention, comprising a receiver branch with a receiver front-end stage 2 that is coupled, at an input side, to an antenna 3, and at an output side, to a mixer 4 for mixing down a radio frequency signal RP to an intermediate frequency signal IF. The mixer 4 and the front-end 2 provide the required channel selectivity of the radio receiver 1. The radio receiver 1 further comprises a controllable local oscillator 5 that is coupled to the mixer 4. The IF signal is fed to further stages in the receiver (not shown) for demodulating the signal IF to a baseband signal. In a broadcast receiver or in a cordless or cellular telephony receiver, this baseband signal is processed and amplified and fed to a speaker. In a paging receiver, a message is detected from the baseband signal. Other applications involve data processing, or the like. The signal IF is further fed to a logarithmic level detector 6 according to the present invention. At an output side, the level detector 6 is coupled to an analog-to-digital converter 7 for providing samples to a digital signal processor 8. The digital processor 8 applies the sampled level signal for various control purposes. In a stereo broadcast receiver, for instance, the sampled level signal is used to control switching over the receiver from a stereophonic reception mode to a monophonic reception mode, and also for other purposes such as multipath control and muting control. Such a control requires a very accurate detection of received signal strength as according to the present invention. In such control, different received signal strengths are used for different control purposes. In case of a cordless telephone or a cellular phone, the receiver is extended with a transmitter so as to form a transceiver including a transmit branch having a mixer 9 coupled to a transmitter front-end stage 10. Then, the receiver front-end stage 2 and the transmitter front-end stage 10 are coupled to a duplexer 11, or the like. In such a transceiver, an accurate measurement of the received signal strength is needed for an accurate transmitter output power control.

Figure 2:
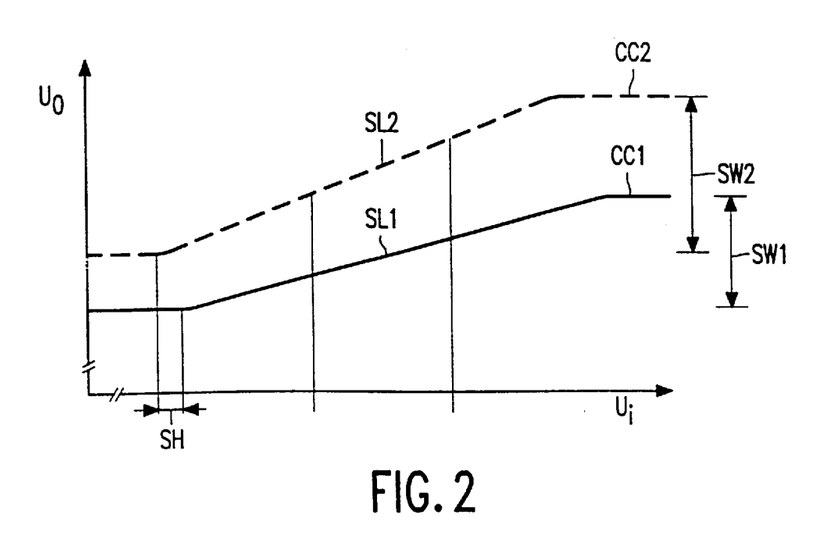
FIG. 2 shows input/output characteristics of a prior art logarithmic level detector.

FIG. 2 shows input/output characteristics of a prior art logarithmic level detector, such as described in said U.S. Pat. No. 5,338,985. Shown is a prior art level detector, output voltage $U_o$ as a function of a detector input voltage $U_i$. A first characteristic CC1 and a second characteristic CC2 are shown for different temperatures, the characteristic CC1 representing a low temperature, e.g., −40° and the characteristic CC2 representing a high temperature, e.g., +85°. Due to temperature drift, the characteristics are different for different temperatures. This leads to an inaccurate detection of the received field strength of the radio frequency signal RF. The characteristics CC1 and CC2 show that, due to temperature effects, a detector output voltage swing SW1 at the lower temperature is smaller than a voltage swing SW2 at the higher temperature, the characteristics are shifted over an input voltage range SH, and the characteristics have different slopes SL1 and SL2, the slope SL2 at the higher temperature being steeper than the slope SL1 at the lower temperature. Such a detector characteristics variation with temperature leads to an inaccurate detection. It should be realized that the input voltage is shown on a logarithmic scale and that the output voltage is displayed on a linear scale. So, in the prior art detector, temperature variations have a great effect on the level detector output voltage for a given input voltage. The present invention provides measures that renders the detector very accurate, at a given detector input signal range or even over the whole input range. As further can be seen in FIG. 2, the characteristics are flat for low input voltages and for high input voltages. The flat characteristic at low input voltages is due to the fact that the detector stages comprise a rectifier. An initial input voltage is needed to let the detector work beyond its sensitivity level. The flat characteristic at high input voltages is due to the limiting stages becoming saturated. This property of the input/output characteristic is used in the logarithmic level detector according to the present invention.

Figure 3:
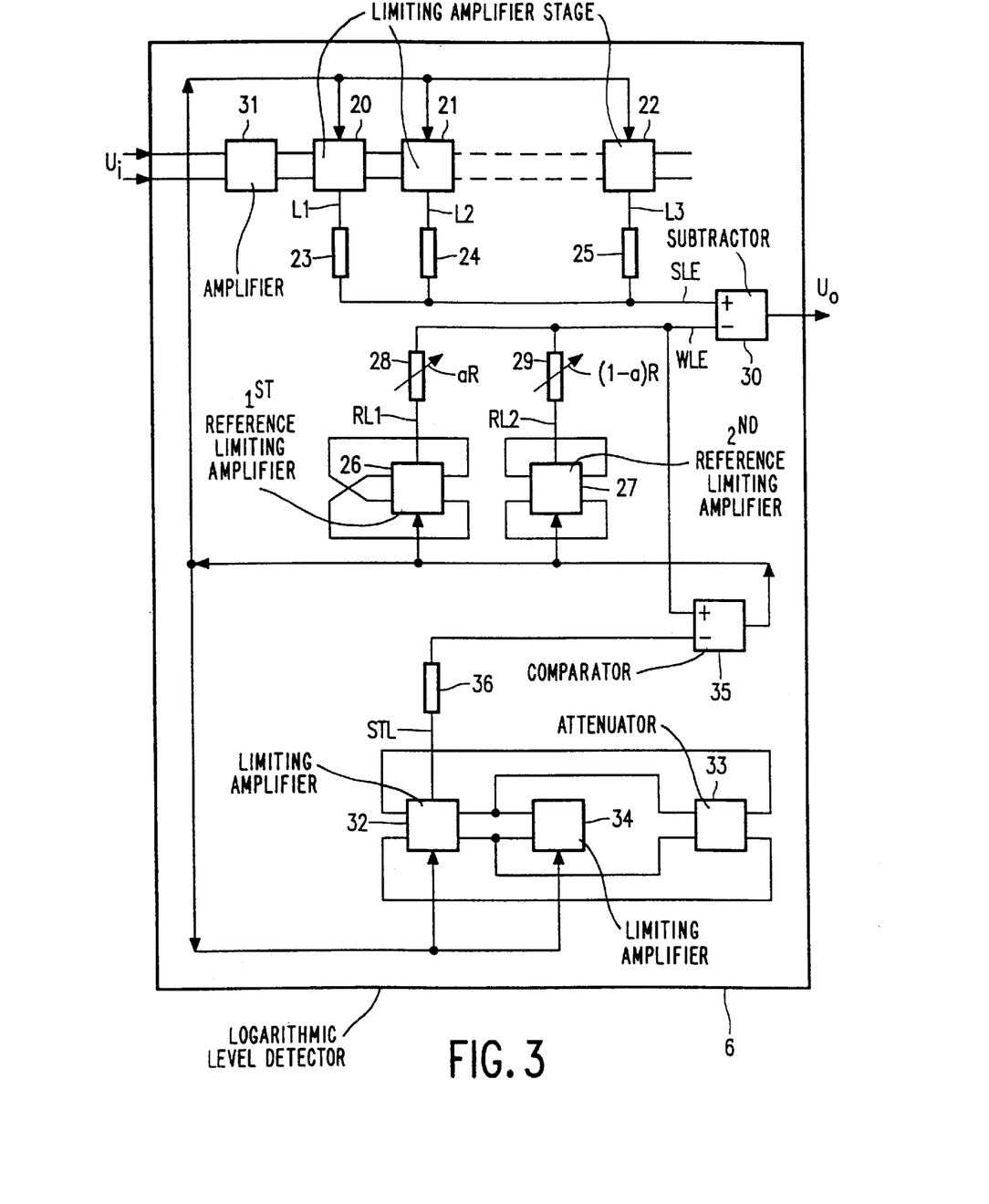
FIG. 3 shows a block diagram of a logarithmic level detector according to the present invention.

FIG. 3 shows a block diagram of the logarithmic level detector 6, according to the present invention, comprising a cascade of a plurality of limiting amplifier stages 20, 21, and 22, providing respective level signals L1, L2, and L3 which are added by coupled resistors 23, 24, and 25 so as to form a summed signal SLE. In a practical embodiment, the number of stages can be eight, for instance. According to the present invention, the logarithmic level detector 6 further comprises a first reference limiting amplifier stage 26 for forming a first reference level signal RL1 representing a relatively low detector input signal value, and a second reference limiting amplifier 27 for forming a second reference level signal RL2 representing a relatively high detector input signal. The reference, level signals RL1 and RL2 are summed by means of coupled resistors 28 and 29 so as to provide a weighted summed reference signal WLE. The summed signal SLE and the weighted summed reference signal WLE are fed to respective inputs of a subtracter 30 so as to form the level detector output signal $U_o$. Herewith, a relative, rather than absolute, level detector output signal is formed that is temperature compensated for a given and relatively small range of detector input signals. A weighting factor a of the reference voltage weighting can be chosen and adjusted such that maximum accuracy in the level detector output signal $U_o$ is achieved at a given input range around a desired control voltage to be generated by the digital signal processor 8. In FIG. 3, this weighting is schematically indicated with a resistance value a.R as a weighting factor for the resistor 28, and with a resistance value (a−1).R as a weighting factor for the resistor 29. The reference values RL1 and RL2 are chosen in a flat region of the input/output characteristic of the logarithmic level detector 6, preferably at zero input voltage and at maximum input voltage, respectively. The latter embodiment is achieved by cross-coupling of inputs and outputs of the reference limiting amplifier 26, and by straight coupling of inputs and outputs of the reference level amplifier 27, as shown in FIG. 3. In order to improve the logarithmic level detector 6, the subtracter 30 is a subtracting compensating amplifier stage having a gain factor that is inversely proportional to an output voltage swing of the detector. This means that in practical situations, the gain factor is approximately inversely proportional to absolute temperature. Herewith, voltage swing variations between swings SW1 and SW2 are compensated for. In order to further improve the logarithmic level detector 6, at the input side, the level detector 6 comprises a compensating amplifier input stage 31 having a gain factor that is proportional to the output voltage swing of the detector. This means that in practical situations, the gain factor is approximately proportional to absolute temperature. Herewith, the shift SH in input/output characteristics with temperature variations of the level detector is compensated for. In order that the logarithmic level detector 6, according to the present invention, operates very accurate over the whole detector input voltage range, for a variations in the overall gain of the cascade of limiting amplifier stages, due to temperature and manufacturing process spread, the detector comprises gain adjustment means for adjustment of a common gain factor on the basis of common adjustment of gains of the stages. The gain adjustment means comprises a cascade of a further limiting amplifier stage 32 and an attenuator stage 33 that is positively fed back to the amplifier stage 32. For perfect balancing, the further limiting amplifier stage 34 is coupled to a still further limiting amplifier stage 34 as a load. The limiting amplifier 32 provides a level signal STL to be fed to an input of an analog comparator 35 via a resistor. The weighted summed reference signal WLE is fed to another input of the comparator 35. Because of the positive feedback, with increasing gain the cascade of the amplifier 32 and the attenuator has a tendency to become bi-stable, i.e., a loop gain approximates one. The comparator 35 detects such a tendency of the cascade to become bi-stable, and acts as a control arrangement that decreases a control voltage. Herewith, the control of the overall gain becomes stable, and the overall gain factor is virtually only determined by the attenuator 33. The overall gain factor becomes the inverse of an attenuation factor of the attenuator 33. Such an attenuator can be made very stable with temperature variations, and can be a resistive network to be integrated on the same chip other components of the detector 6. At the output side, the comparator 35 is coupled to the limiting amplifier stages 20, 21, and 22 of the detector 6 itself, to the further limiting amplifiers 32 and 34 of the gain stabilizer, and to the reference limiting amplifier stages 26 and 27.

Figure 4:
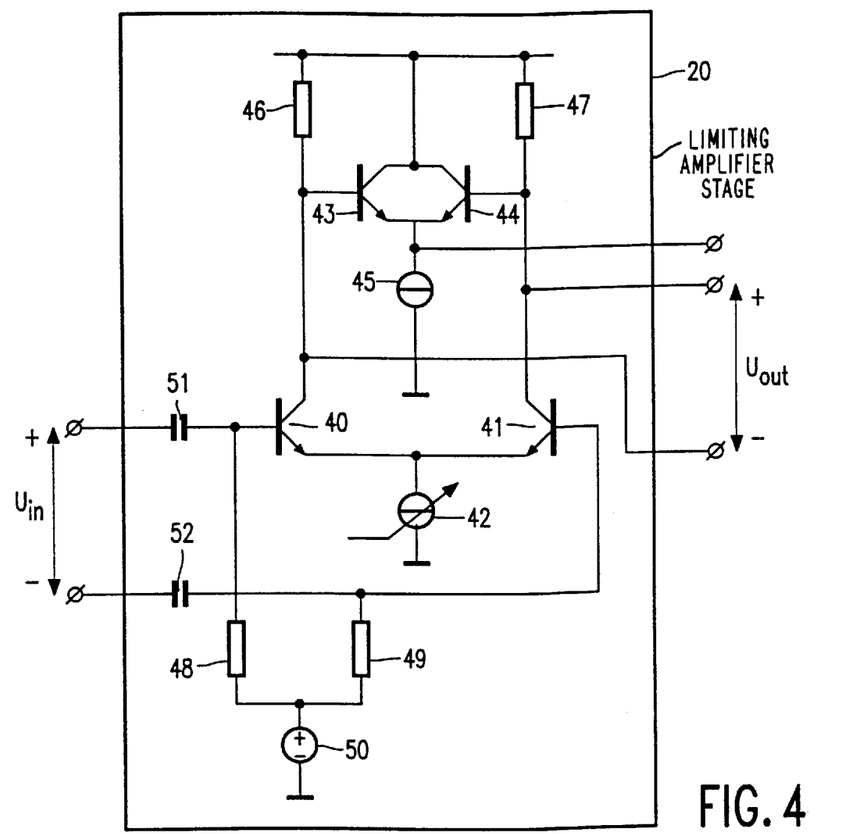
FIG. 4 shows a limiting amplifier stage for use in a logarithmic level detector according to the present invention.

FIG. 4 shows the limiting amplifier stage 20 for use in the logarithmic level detector 6 according to the present invention. The limiting amplifier stages 21 and 22 are similar. The limiting amplifier stage 20 comprises a differential pair of bipolar transistors 40 and 41 having their emitters coupled to an adjustable current source 42. At the output side, the differential pair is coupled to a full-wave rectifier formed by bipolar transistors 43 and 44 and the current source 45. Furthermore, the amplifier stage comprises resistors 46, 47, 48, and 49, a voltage reference source 50, and coupling capacitors 51 and 52, at the input side. The stage 20 has respective input and output voltages $U_{in}$ and $U_{out}$. The current sources 42 and 45 are so-called band-gap reference circuits of which an output current value is proportional to absolute temperature.

Figure 5:
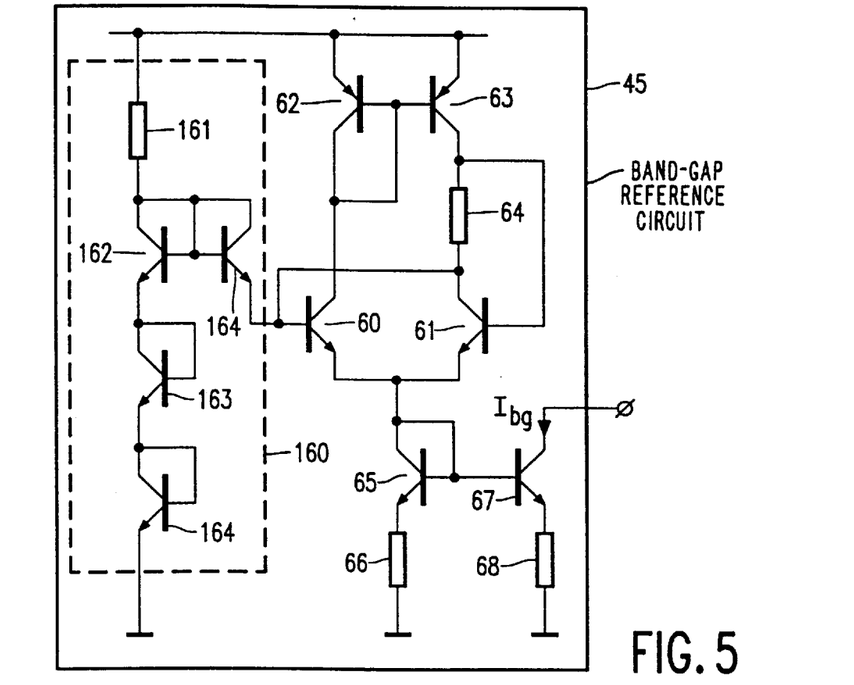
FIG. 5 shows a bandgap reference circuit for use in a limiting amplifier stage in a logarithmic level detector according to the present invention.

FIG. 5 shows a band-gap reference circuit 45 for use in the limiting amplifier stage 20 in the logarithmic level detector according 6 to the present invention. This band-gap reference is the basis of a number of differential pairs tail currents adjustments in the detector 6. The band-gap reference circuit 45 comprises a cascode of differential transistor pairs 60 and 61, and of 62 and 63, the transistor 62 being connected in a current mirror configuration, an output of the transistor 61 being coupled to an input of the transistor 60, and a resistor 64 being coupled in a main current path between the transistors 61 and 63. In a tail of the cascode, a current mirror is provided, being a transistor 65 and a resistor 66 of which a current is mirrored to an output transistor 67, of which an emitter is coupled to a voltage rail via a resistor 68. An output current $I_{bg}$ is a function of a resistor value of the resistor 64 and the ratio of emitter surfaces of the transistors 60 and 61. Furthermore, the current $I_{bg}$ is proportional to absolute temperature, a well-known property of band-gap reference circuits. In order that the band-gap reference circuit 45 starts-up correctly, it comprises a start-up circuit 160 that is coupled to a base of the transistor 60. The start-up circuit 160 comprises a series arrangement of a resistor 161, a transistor 162, a transistor 163, and a transistor 164 coupled between supply rails, the transistors 162, 163, and 164 having their respective bases connected to their respective collectors. A base of the transistor 162 is coupled to a base of a transistor 164 that is coupled with its emitter to a base of the transistor 60. A base and a collector of the transistor 164 are connected to each other.

Figure 6:
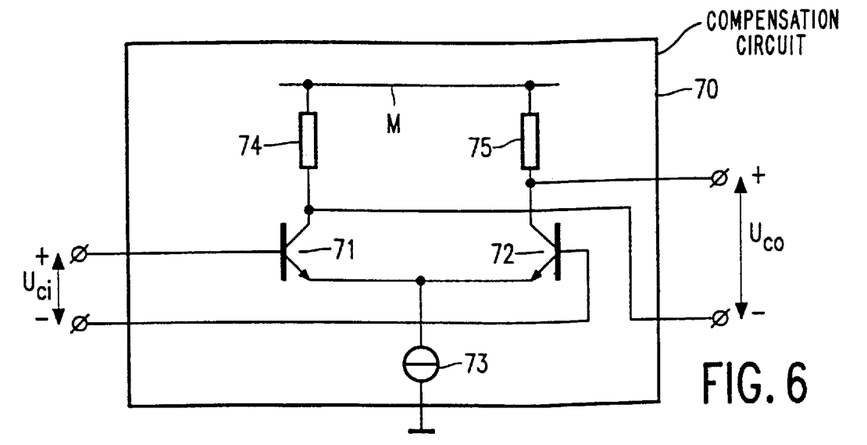
FIG. 6 shows a compensation circuit for use in a logarithmic level detector according to the present invention.

FIG. 6 shows a compensation circuit 70 for use in the logarithmic level detector 6 according to the present invention, either to be used as the compensating amplifier input stage 31 or to be used as the subtracting compensating amplifier stage 30 at the output side of the level detector 6, depending on tail current adjustment. The compensating circuit 70 comprises a differential pair of transistors 71 with a tail current source 73, and output resistors 74 and 75 coupled to a voltage rail M. Furthermore, input and output voltages $U_{ci}$ and $U_{co}$ are shown.

Figure 7:
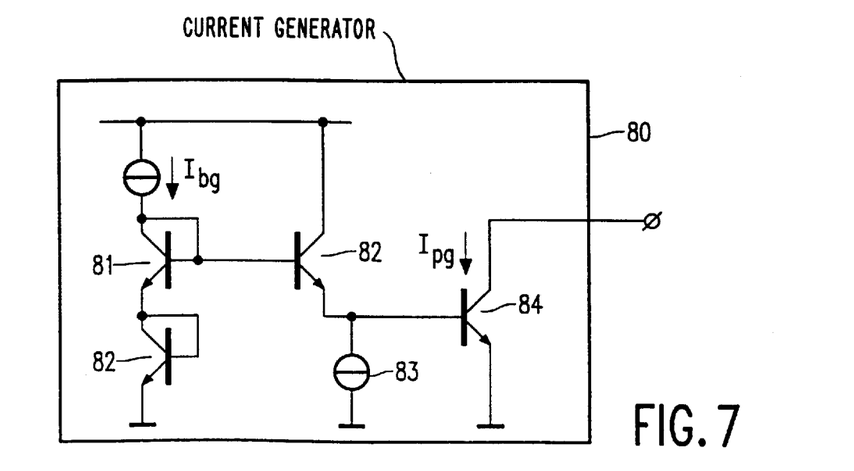
FIG. 7 shows a first current generator for a first compensation circuit to be used at input side of a logarithmic level detector according to the present invention.

FIG. 7 shows a first current generator 80 for the first compensation circuit 31 to be used at input side of the logarithmic level detector 6 according to the present invention, the current generator 80 forming the tail current 73. The current $I_{bg}$ is generated by means of the band-gap reference circuit 45 as shown in FIG. 5. The current generator 80 generates a current $I_{pg}$ that is proportional to the square of absolute temperature. Herewith, the compensating amplifier stage 31 has a gain factor that is proportional to absolute temperature. The current generator 80 comprises a cascode of transistors 81 and 82 in series with the current source $I_{bg}$, both transistors being switched as current sources. The current source $I_{bg}$ is mirrored into a transistor 82 having a constant current source 83 in its emitter lead. An output transistor 84 is coupled to a junction of the emitter of the transistor 82 and the constant current source 83. Herewith, the current $I_{pg}$ is proportional to the square of absolute temperature.

Figure 8:
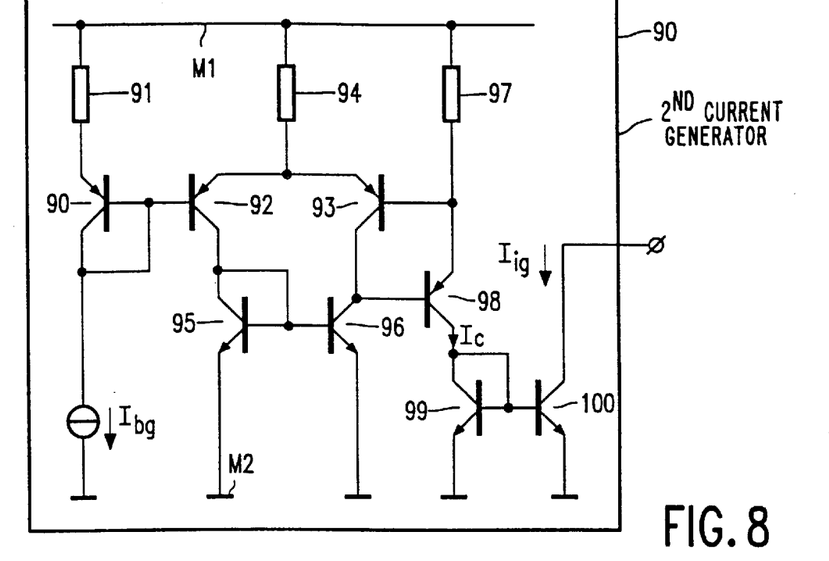
FIG. 8 shows a second current generator for a second compensation circuit to be used at output side of a logarithmic level detector according to the present invention.

FIG. 8 shows a second current generator 90 for the second compensation circuit 30 to be used at the output side of the logarithmic level detector 6 according to the present invention, the current generator 90 forming the tail current 73. The current $I_{bg}$ is generated by means of the band-gap reference circuit 45 as shown in FIG. 5. The current generator 90 generates a current $I_{ig}$ that is constant. Herewith, the compensating stage 31 has a gain factor that is inversely proportional to absolute temperature. The current generator 90 comprises the bandgap reference current source $I_{bg}$ in collector lead of a transistor 90 configured as a current mirror and having a resistor 91 in its emitter lead. The resistor 91 is chosen to have the same voltage variation per grade centigrade as the emitter base junction of the transistor 91, albeit in opposite sense. A base of the transistor 90 is coupled to a first input of a differential pair 92 and 93 having its emitters connected and being coupled to the positive rail M1 via a resistor 94. A collector of the transistor 92 is coupled to a negative rail M2 via a transistor 95 connected in a current source configuration, and a collector of the transistor 93 is connected to the negative rail M2 via a transistor 96 having its base connected to a base of the transistor 95. A base of the transistor 93 is coupled to the positive rail M1 via a resistor 97 and further to an emitter of a transistor 98 of which a base is connected to a collector of the transistor 96. A collector current $I_c$ of the transistor 98 is mirrored to form the output current $I_{ig}$ by means of a current mirror formed by transistors 99 and 100.

Figure 9:
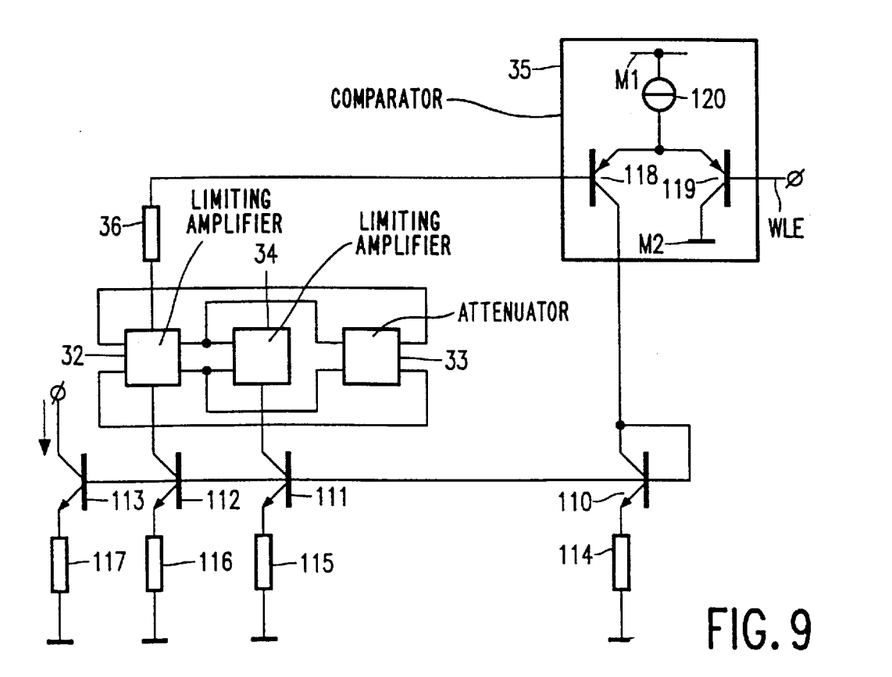
FIG. 9 shows a function stabilizer for stabilizing an overall gain of a logarithmic level detector according to the present invention.

FIG. 9 shows a function stabilizer for stabilzing an overall gain of the logarithmic level detector 6 according to the present invention comprising the limiting amplifiers 32 and 34, the attenuator 33, the comparator 35, and further a current mirror configuration for getting proper control of the stages 32 and 34 and further of the stages 20, 21, 22, 26, and 27. The current mirror configuration comprises a transistor 110 connected in current source configuration, of which a current from the comparator 35 is mirrored into transistors 111, 112, and 113. The transistor 111 is coupled to the stage 34, the transistor 112 is coupled to the stage 32, and the transistor 113 is coupled to the stage 20. Further transistors (not shown in detail) in the current mirror configuration, like the transistor 113, are coupled to the stages 21, 22, 26, and 27. The current mirror configuration further comprises resistors 114, 115, 116, and 117. The comparator 35 is an analog comparator comprising transistors 118 and 119 having their emitters coupled to each other. A current source 120 is coupled between the emitters of the transistors 118 and 119 and the positive rail M1.

Figure 10:
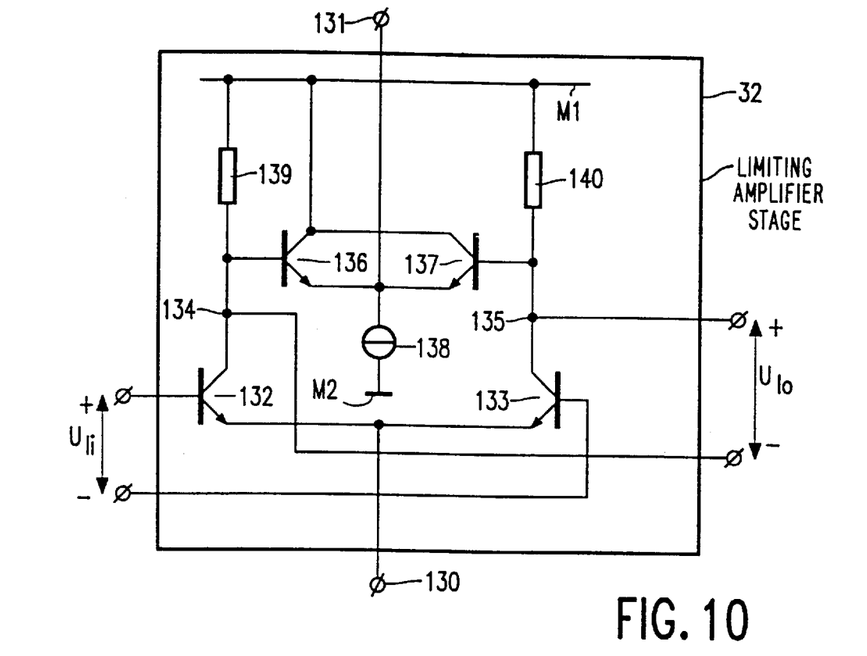
FIG. 10 shows a limiting amplifier stage for use in a function stabilizer according to the present invention.

FIG. 10 shows the limiting amplifier stage 32 for use in the function stabilizer according to the present invention. The limiting amplifier stage 34, being a load of the stage 32, is similar to the stage 32. Limiting amplifier input and output voltages $U_{li}$ and $U_{lo}$ are shown, and further, a connection terminal 130 for connection to a collector of the transistors 111 or 112, and a connection terminal 131 for connection to the resistor 36 for the limiting amplifier stage 32 only. The limiting amplifier stage 32 comprises a differential pair of transistors 132 and 133 at inputs of which the voltage $U_{li}$ is fed and at outputs 134 and 135 of which the voltage $U_{lo}$. is available. A full-wave rectifier, that is formed of transistors 136, and 137 is coupled to the outputs 134 and 135, and provides a level voltage at coupled emitters of the transistor pair 134 and 135, which level voltage is available at the output terminal 131. A current source 138 is coupled between the emitters of the transistors, 136 and 137 and the negative rail M2. Bases of the transistors 136 and 137 are coupled to the positive rail M2 via respective resistors 139 and 140.

Figure 11:
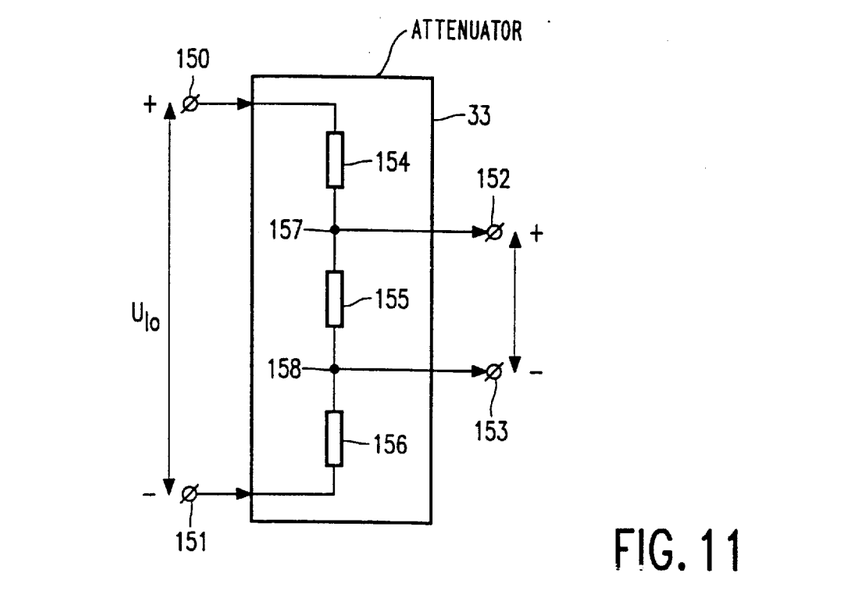
FIG. 11 shows an attenuator stage for use in a function stabilizer according to the present invention.

FIG. 11 shows the attenuator stage 33 for use in a function stabilizer according to the present invention. The attenuator stage 33 has input terminals 150 and 151 to which the output voltage $U_{lo}$ of the limiting amplifier stage 32 is fed, and output terminals 152 and 153 for coupling the attenuator stage to inputs of the limiting amplifier stage 32. The attenuator 33 comprises a series arrangement of resistors 154, 155 and 156 connected between the terminals 150 and 151. The output terminals 152 and 153 of the attenuator stage are coupled to a junction 157 of the resistors 154 and 155, and to a junction 158 of the resistors 155 and 156, respectively. Resistance values of the resistors 154, 155, and 156 are chosen such that the inverse of an attenuation factor of the attenuator stage 33 is equal to the desired gain factor of the limiting amplifier stages.

In a preferred embodiment of the logarithmic level detector 6 according to the present invention, all circuitry is integrated on the same integrated circuit.

We claim:

1. A logarithmic level detector comprising a cascade of a plurality of limiting amplifier stages, each having a rectifier for providing a level signal, said logarithmic level detector further comprising summing means for forming a summed signal from the respective level signals, the summed signal being a logarithmical amplified version of a level detector input signal, characterized in that the logarithmic level detector further comprises:

a first reference limiting amplifier stage for forming a first reference level signal representing a relatively low input signal value;

a second reference limiting amplifier stage for forming a second reference level signal representing a relatively high input signal;

weighted summing means for forming a weighted summed reference signal from the first and the second reference signals; and subtracting means for subtracting the weighted summed reference signal from the summed signal so as to form a level detector output signal.

2. A logarithmic level detector according to claim 1, wherein the weighted summing means has an adjustable weighting factor.

3. A logarithmic level detector means according to claim 1, wherein the subtracting means is a subtracting compensating amplifier stage having a gain factor that is inversely proportional to an output voltage swing of the logarithmic level detector.

4. A logarithmic level detector according to claim 1, wherein, at an input side, the level detector comprises a compensating amplifier input stage having a gain factor that is proportional to an output voltage swing of the logarithmic level detector.

5. A logarithmic level detector according to claim 1, wherein the logarithmic level detector further comprises gain adjustment means for adjustment of a common gain factor of the limiting amplifier stages and the reference limiting amplifiers, the gain adjustment means comprising:

a cascade of a further limiting amplifier stage having a rectifier for providing a gain adjustment level signal, and an attenuator stage that is positively fed back to the amplifier stage; and comparator means for comparing a weighted summing means output signal with the gain adjustment level signal, an output signal of the comparator means being representative for the common gain factor.

6. A logarithmic detector according to claim 5, wherein the attenuator stage is a resistive network of which an attenuation factor is an inverse of the common gain factor.

7. A radio receiver comprising a front-end stage, a mixing stage for mixing down a radio frequency signal to an intermediate frequency signal, and a logarithmic level detector comprising a cascade of a plurality of limiting amplifier stages, each having a rectifier for providing a level signal, said logarithmic level detector further comprising summing means for forming a summed signal from the respective level signals, the summed signal being a logarithmical amplified version of a level detector input signal, characterized in that the logarithmic level detector further comprises:

a first reference limiting amplifier stage for forming a first reference level signal representing a relatively low input signal value;

a second reference limiting amplifier stage for forming a second reference level signal representing a relatively high input signal;

weighted summing means for forming a weighted summed reference signal from the first and the second reference signals; and subtracting means for subtracting the weighted summed reference signal from the summed signal so as to form a level detector output signal.

8. A radio receiver according to claim 7, which is arranged for receiving monophonic and stereophonic radio signals, wherein the level detector output signal controls switching over the receiver from a stereophonic receiving mode to a monophonic receiving mode.

* * * * *